US012440387B2

(12) United States Patent
Lo et al.

(10) Patent No.: US 12,440,387 B2
(45) Date of Patent: Oct. 14, 2025

(54) ASSISTIVE SMART GLASSES FOR VISUAL IMPAIRMENT, AND SYSTEM AND CONTROL METHOD THEREOF (71) Applicant: InnoSpire Technology Limited, Hong Kong (HK)

(72) Inventors: Kwok Hing Lo, Hong Kong (HK); Kai Wing Siu, Hong Kong (HK); Wai Man Lau, Hong Kong (HK)

(73) Assignee: InnoSpire Technology Limited, Hong Kong (HK)

( * ) Notice: Subject to any disclaimer, the term of this patent is extended or adjusted under 35 U.S.C. 154(b) by 449 days.

(21) Appl. No.: 18/005,873

(22) PCT Filed: Nov. 16, 2021

(86) PCT No.: PCT/CN2021/130925
§ 371 (c)(1),
(2) Date: Jan. 18, 2023

(87) PCT Pub. No.: WO2022/116812
PCT Pub. Date: Jun. 9, 2022

(65) Prior Publication Data
US 2023/0270593 A1    Aug. 31, 2023

(30) Foreign Application Priority Data
Dec. 1, 2020    (CN) .................. 202011385491.8

(51) Int. Cl.
*A61F 9/08*    (2006.01)
*G02C 11/00*    (2006.01)
(Continued)

(52) U.S. Cl.
CPC ................ *A61F 9/08* (2013.01); *G02C 11/10* (2013.01); *G06N 3/0464* (2023.01); *G06N 3/08* (2013.01)

(58) Field of Classification Search
CPC ......... A61F 9/08; G02C 11/10; G06N 3/0464; G06N 3/08; G06N 3/045; G02B 2027/014; G02B 2027/0178; G02B 27/017
See application file for complete search history.

(56) References Cited

U.S. PATENT DOCUMENTS

2016/0209648 A1* 7/2016 Haddick .............. G04G 21/025
2018/0189567 A1   7/2018 Maheriya et al.
(Continued)

FOREIGN PATENT DOCUMENTS

CN    103946732 A    7/2014
CN    104143084 A    11/2014
(Continued)

OTHER PUBLICATIONS

International search report of PCT/CN2021/130925.

*Primary Examiner* — Nathan J Flynn
*Assistant Examiner* — Christine A Kurien (57) ABSTRACT The present invention discloses assistive smart glasses for visual impairment, and a system and a control method thereof. The smart glasses include a glasses body, wherein a microprocessor, a bone conduction headphone, a wireless communication module, a CCD optical module, a DSP image processing module, a camera lens, a memory module, a power supply module, a rechargeable battery, and an I/O data port are integrated in the glasses body; the camera lens is disposed at a front end of the glasses body; the CCD optical module converts an optical image captured by the camera lens into high-resolution compression data and sends the high-resolution compression data to the DSP image processing module; the microprocessor is electrically connected to the bone conduction headphone, the wireless communication module, and the DSP image processing module via the I/O data port; the memory module and the
(Continued)

power supply module are electrically connected to the microprocessor; and the rechargeable battery is electrically connected to the power supply module. According to the invention, image signals can be read, processed, and identified in real time from a viewpoint of a visual impaired user, and the visual impaired user can be informed by means of audio signals, such that the visual impaired user can be assisted in real time to recognize scenes and objects.

6 Claims, 8 Drawing Sheets

(51) Int. Cl.
*G06N 3/0464* (2023.01)
*G06N 3/08* (2023.01)

(56) References Cited

U.S. PATENT DOCUMENTS

| | | | |
|---|---|---|---|
| 2018/0211157 A1* | 7/2018 | Liu | G06T 3/4007 |
| 2020/0349610 A1* | 11/2020 | Publicover | H04L 67/306 |
| 2023/0045237 A1* | 2/2023 | Wexler | G06V 40/20 |

FOREIGN PATENT DOCUMENTS

| | | |
|---|---|---|
| CN | 104983511 A | 10/2015 |
| CN | 106406445 A | 2/2017 |
| CN | 107223261 A | 9/2017 |
| CN | 107424481 A | 12/2017 |
| CN | 110478204 A | 11/2019 |
| CN | 111432989 A | 7/2020 |
| CN | 112370240 A | 2/2021 |
| CN | 214231714 U | 9/2021 |
| WO | 2019221416 A1 | 11/2019 |

* cited by examiner

Input  Feature extraction + classification  Output

ASSISTIVE SMART GLASSES FOR VISUAL IMPAIRMENT, AND SYSTEM AND CONTROL METHOD THEREOF

TECHNICAL FIELD

The invention relates to the field of artificial vision technology, and in particular to assistive smart glasses for visual impairment, and a system and a control method thereof.

BACKGROUND

At present, users need to use mobile phones or computers to transmit both images and sound at the same time to a remote party, or need to connect a camcorder to the Internet and transmit images and sound in real time. Far from resembling ordinary glasses in appearance, most smart glasses or Internet of Things (IoT) devices are cumbersome, which inconveniences the users and makes them feel embarrassed. A sound receiving process of users may be disturbed by environmental noise, resulting in unclear reception or other problems.

Currently, smart glasses on the market only use simple AI MCU or transmit data to the cloud for processing and recognition. However, there are scenarios where artificial intelligence cannot provide the most needed assistance for the visually impaired and the elderly, such as accurately recognizing streets and characters. In addition, in the case of cloud processing, a long delay may exist, and problems cannot be solved through interaction with people.

SUMMARY

The technical problem to be solved by embodiments of the present invention is to provide assistive smart glasses for visual impairment, and a system and a control method thereof in order to assist a visually impaired user in image recognition.

To solve the above technical problem, an embodiment of the present invention provides assistive smart glasses for visual impairment, including a glasses body, where a microprocessor, a bone conduction headphone, a wireless communication module, a CCD optical module, a DSP image processing module, a camera lens, a memory module, a power supply module, a rechargeable battery, and an I/O data port are integrated in the glasses body; the camera lens is disposed at a front end of the glasses body; the CCD optical module converts an optical image captured by the camera lens into high-resolution compression data and sends the high-resolution compression data to the DSP image processing module; the microprocessor is electrically connected to the bone conduction headphone, the wireless communication module, and the DSP image processing module via the I/O data port; the memory module and the power supply module are electrically connected to the microprocessor; and the rechargeable battery is electrically connected to the power supply module.

Further, the wireless communication module is at least one of a Wi-Fi module, a Bluetooth module, or a 5G module.

Accordingly, an embodiment of the present invention further provides an assistive smart glasses system for visual impairment, including the assistive smart glasses for visual impairment described above, and further including a mobile terminal, a server, and a service terminal.

The assistive smart glasses are configured to be communicatively connected to the mobile terminal through a wireless communication module, capture an image of a view in front of a visually impaired user in real time, send the image to the mobile terminal, and output information returned by the mobile terminal through the bone conduction headphone.

The mobile terminal is configured to preprocess in real time the image sent by the assistive smart glasses, keep comparing the preprocessed image with digital target default values, and send a result to the assistive smart glasses in response to similarity reaching a threshold; or in response to no similarity reaching the threshold in the comparison or a user choosing to enter a manual mode, upload the current image to the server and send information returned by the server to the assistive smart glasses.

The server is configured to assign the image uploaded by the mobile terminal to the service terminal, and return a recognition result uploaded by the service terminal to the corresponding mobile terminal; or connect the assistive smart glasses and the service terminal in real time through a network.

The service terminal is configured to be used by a corresponding volunteer to receive the image uploaded by the mobile terminal via the service terminal and then send a manual recognition result provided by the volunteer to the server; or to be communicatively connected to the assistive smart glasses, so as to enable direct real-time communication between the volunteer and the visually impaired user and provide manual assistance for the visually impaired user in real time.

Further, the mobile terminal preprocesses the image using a convolutional neural network model, and outputs a result obtained by processing the image data sequentially through a first convolutional layer, a second convolutional layer, a pooling layer, a first fully connected layer, and a second fully connected layer of the convolutional neural network model.

Further, the mobile terminal further includes a character recognition module which is configured to recognize characters in the image and send a recognition result to the assistive smart glasses.

Accordingly, an embodiment of the present invention further provides a control method of assistive smart glasses system for visual impairment, including:

step 1: assistive smart glasses for visual impairment capturing an image of a view in front of a visually impaired user in real time and sending the image to a mobile terminal;

step 2: the mobile terminal preprocessing in real time the image sent by the assistive smart glasses, keeping comparing the preprocessed image with digital target default values, and sending a result to the assistive smart glasses in response to similarity reaching a threshold; or uploading the current image to a server, in response to no similarity reaching the threshold in the comparison or a user choosing to enter a manual mode;

step 3: the server assigning the image uploaded by the mobile terminal to the service terminal, and returning a recognition result uploaded by the service terminal to the corresponding mobile terminal; or connecting the assistive smart glasses and the service terminal in real time through a network; and step 4: the service terminal receiving the image uploaded by the mobile terminal, and then sending a manual recognition result provided by a volunteer to the server; or being communicatively connected to the assistive smart glasses, so as to enable direct real-time communication between the volunteer and the visually impaired user and provide manual assistance for the visually impaired user in real time.

Further, at step 1, the image is preprocessed using a convolutional neural network model to output a result obtained by processing the image data sequentially through a first convolutional layer, a second convolutional layer, a pooling layer, a first fully connected layer, and a second fully connected layer of the convolutional neural network model.

Further, step 1 further includes a character recognition substep: recognizing characters in the image and sending a recognition result to the assistive smart glasses.

The present invention has the following beneficial effects: According to the invention, image signals can be read, processed, and identified in real time from a viewpoint of a visual impaired user, and the visual impaired user can be informed by means of audio signals, such that the visual impaired user can be assisted in real time to recognize scenes and objects.

DETAILED DESCRIPTION

It should be noted that embodiments and features of the embodiments of the present application can be combined without conflict. The present invention will be further explained in detail with reference to the accompanying drawings and particular embodiments.

Directional indications (such as upper, lower, left, right, front, back, etc.) in the embodiments of the present invention are merely used to explain a relative position relationship, motion conditions, and the like of the components in a specific gesture (as shown in the drawings). If the specific gesture changes, the directional indication changes accordingly.

In addition, descriptions involving terms such as "first" and "second" in the embodiments of the present invention are only used for descriptive purposes, and cannot be understood as indicating or implying their relative importance or implicitly indicating the number of technical features indicated. Therefore, the features defined with "first" and "second" may explicitly or implicitly include at least one of the features.

Referring to FIGS. 1-4, assistive smart glasses for visual impairment of the embodiments of the present invention include a glasses body. A microprocessor, a bone conduction headphone, a wireless communication module, a CCD optical module, a DSP image processing module, a camera lens, a memory module, a power supply module, a rechargeable battery, and an I/O data port are integrated in the glasses body.

The camera lens is disposed at a front end of the glasses body. The CCD optical module converts an optical image captured by the camera lens into high-resolution compression data and sends the high-resolution compression data to the DSP image processing module. The glasses body may be made of lightweight and sturdy ABS and PC materials. The DSP image processing module converts a simulated image signal into serial digital data by using a 10-bit ADC. Digital data refers to a huge four-dimensional NumPy array. The four dimensions are batch of data, grayscale value of the image, length of the image, and width of the image. Values in the array are floating point numbers between 0 and 1, which represent grayscale values ranging from 0 to 255 of positions after normalization in different images. Each image contains tag information of a specific number, and the tag information of the specific number is stored in another array.

The microprocessor is electrically connected to the bone conduction headphone, the wireless communication module, and the DSP image processing module via the I/O data port. The memory module and the power supply module are electrically connected to the microprocessor. The rechargeable battery is electrically connected to the power supply module. A small rechargeable high-energy lithium battery may be used as the rechargeable battery. An ESP32 single-chip microcomputer is preferably used as the microprocessor, with a DSP image processing module and an I/O data port integrated inside.

Figure 1:
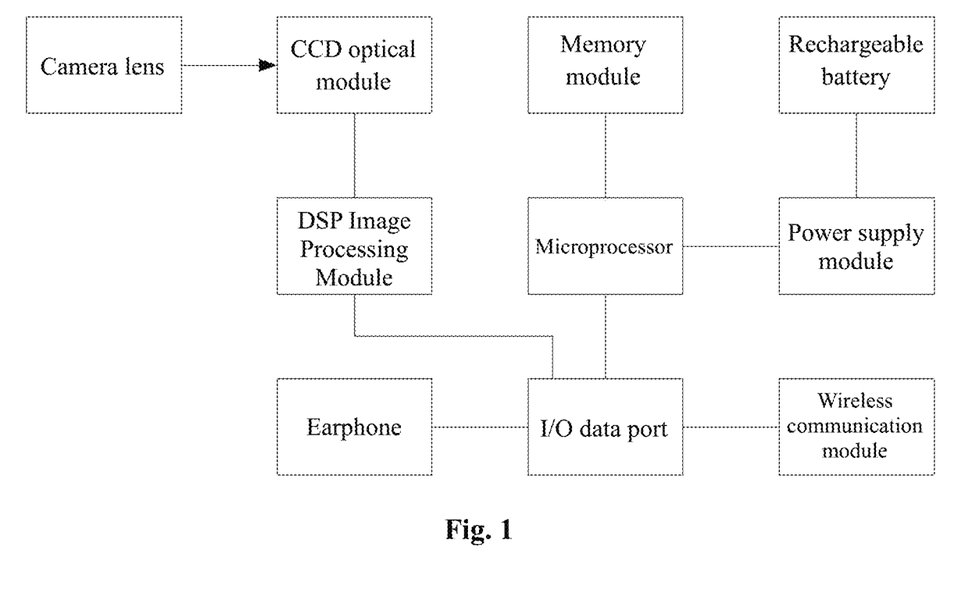
FIG. 1 is a schematic diagram of assistive smart glasses for visual impairment according to an embodiment of the present invention.
Figure 2:
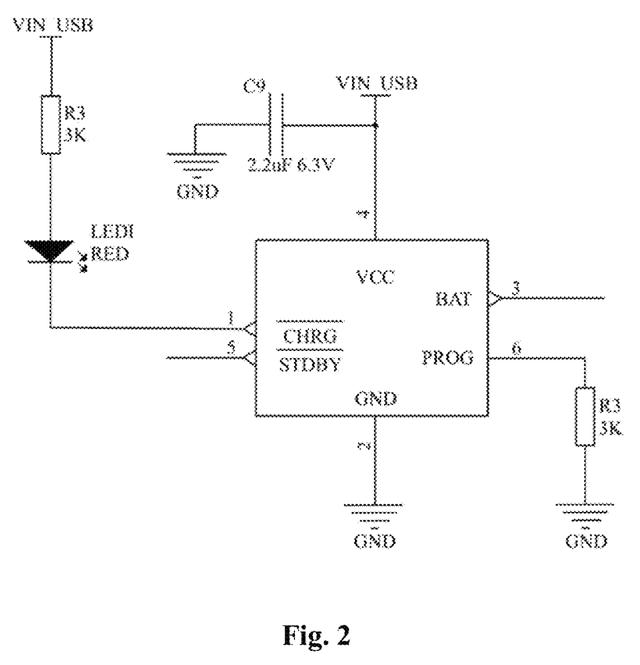
FIG. 2 is a circuit diagram of a power supply module according to an embodiment of the present invention.
Figure 3:
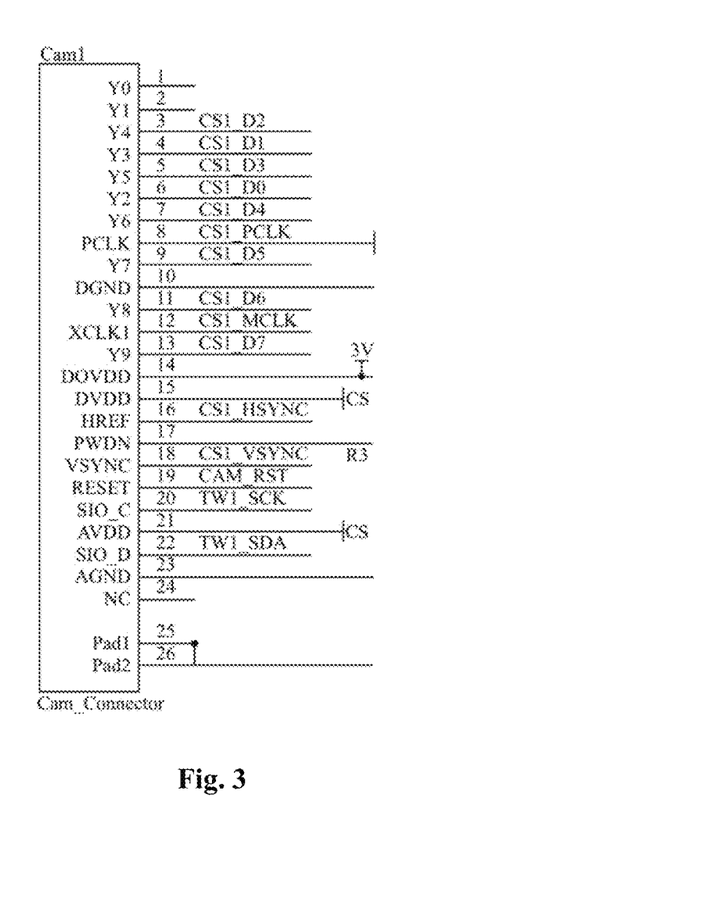
FIG. 3 is a circuit diagram of a CCD optical module according to an embodiment of the present invention.
Figure 4:
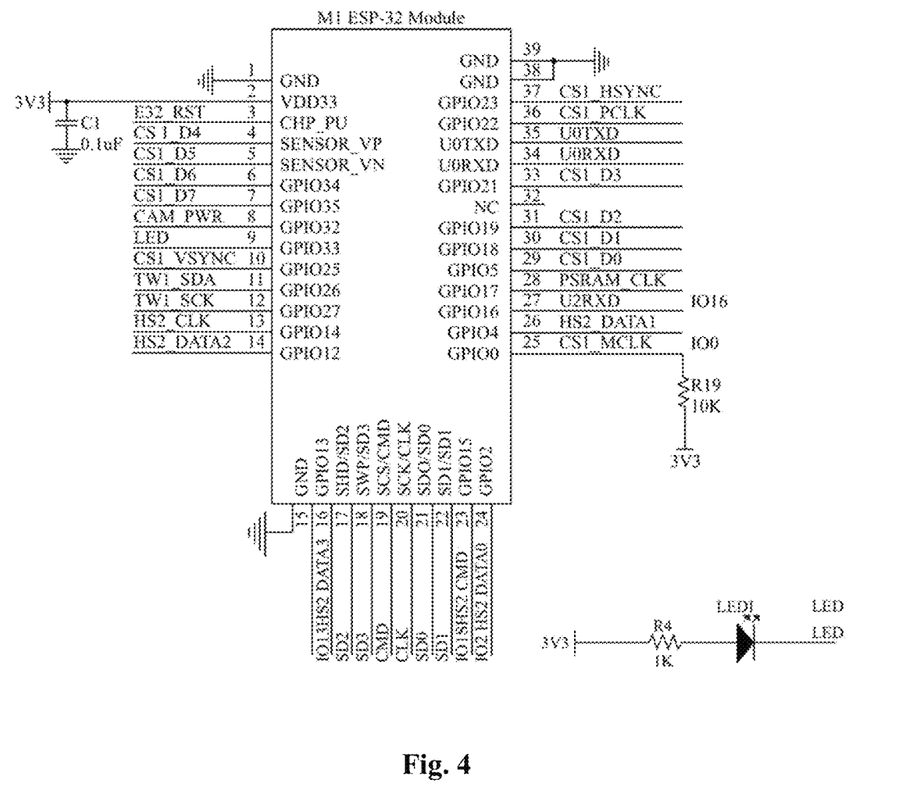
FIG. 4 is a circuit diagram of a microprocessor according to an embodiment of the present invention.

As an implementation, the wireless communication module is at least one of a Wi-Fi module, a Bluetooth module, or a 5G module. According to the present invention, an image is transmitted to a mobile terminal through a wireless signal of the wireless communication module.

As an implementation, a built-in antenna connected to the wireless communication module is integrated in the glasses body.

According to the embodiments of the present invention, a scene in front of a user can be converted into digital image signals for real-time reading, processing and recognition, and the user can be notified by means of audio signals. In addition, the digital image signals are transmitted to a volunteer at a background service terminal through wireless signals and a 4G/5G network, so that the volunteer immediately describes details of the scene in front of the user as a supplement to the audio signals, implementing real-time interactive communication between people. The embodiments of the present invention can be implemented to provide real-time assistance for a visually impaired person, and can also be used by background personnel to give instructions to front-line personnel, monitor, and correct front-line work for better completion of the work.

Figure 5:
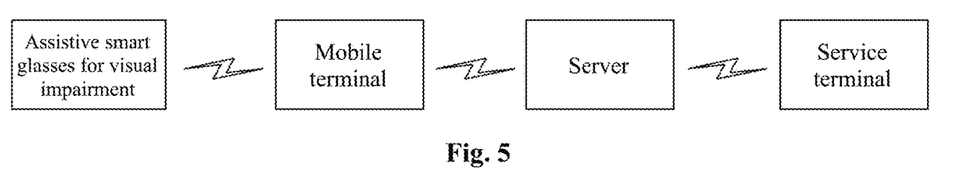
FIG. 5 is a schematic diagram of an assistive smart glasses system for visual impairment according to an embodiment of the present invention.

With reference to FIG. 5, an assistive smart glasses system for visual impairment in the embodiments of the present invention includes assistive smart glasses for visual impairment, a mobile terminal, a server, and a service terminal.

The assistive smart glasses are communicatively connected to the mobile terminal through a wireless communication module, capture an image of a view in front of a visually impaired user in real time, send the image to the mobile terminal, and output information returned by the mobile terminal through a bone conduction headphone.

The mobile terminal is configured to preprocess in real time the image sent by the assistive smart glasses, keep comparing the preprocessed image with digital target default values, and send a result to the assistive smart glasses in response to similarity reaching a threshold; or in response to no similarity reaching the threshold in the comparison or a user choosing to enter a manual mode, upload the current image to the server and send information returned by the server to the assistive smart glasses, for example, indications of human beings (man/woman, old man/child/preset relative and friend), household items (door/window/table/chair/television/sofa/cooker/cup), outdoor objects (car/bus, stairs/elevator) or large road signs, etc. A dataset of the embodiments of the present invention can be continuously updated through self-learning and revision to improve accuracy.

The server is configured to assign the image uploaded by the mobile terminal to the service terminal, and return a recognition result uploaded by the service terminal to the corresponding mobile terminal; or connect the assistive smart glasses and the service terminal in real time through a network.

The service terminal is configured to be used by a corresponding volunteer to receive the image uploaded by the mobile terminal via the service terminal and then send a manual recognition result provided by the volunteer to the server; or to be communicatively connected to the assistive smart glasses, so as to enable direct real-time communication between the volunteer and the visually impaired user and provide manual assistance for the visually impaired user in real time.

The present invention can be implemented to enable a visually impaired user to be assisted in real time or within a shortest time by automatically identifying an image captured by the visually impaired user. In addition, a service provided by the present invention may be operated 24 hours a day by virtue of a large community of volunteers (voluntary workers), as everyone all over the world can download the program and sign up as a volunteer (voluntary worker). Whenever a visually impaired user needs help, the assistive smart glasses volunteer (voluntary worker) can photograph a scene or an object and send it to a in real time, and the volunteer (voluntary worker) at the service terminal will receive a notification and decide whether to respond or not. A volunteer (voluntary worker) who is free at the moment will describe the photo to the visually impaired user by means of voice or a text message.

Further, in order to provide real-time assistance, the embodiments of the present invention also allow a visually impaired user to issue a real-time support request, and a volunteer (voluntary worker) who is free at the moment could contact the visually impaired user by means of a video conference or the like. In this way, the volunteer (voluntary worker) can see the scene in front of the visually impaired user and assist the visually impaired user in real time through voice.

The present invention has greater flexibility in terms of information reception. For visually impaired users, the present invention can be implemented to contact volunteers who are willing to offer help for convenience of the daily life of the visually impaired users by providing visual instructions. For volunteers, the present invention can be implemented to accumulate volunteer hours in addition to helping people anytime and anywhere. For advertisers, the present invention can be implemented to reach a large base of users so that information of the advertisers can be received by different people in different places.

As an implementation, the mobile terminal preprocesses the image using a convolutional neural network model, and outputs a result obtained by processing the image data sequentially through a first convolutional layer, a second convolutional layer, a pooling layer, a first fully connected layer, and a second fully connected layer of the convolutional neural network model.

Figure 7:
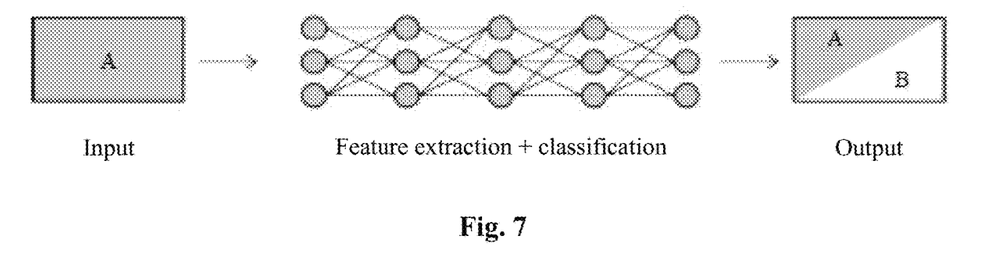
FIG. 7 is a schematic diagram of a convolutional neural network model used in an embodiment of the present invention.
Figure 8:
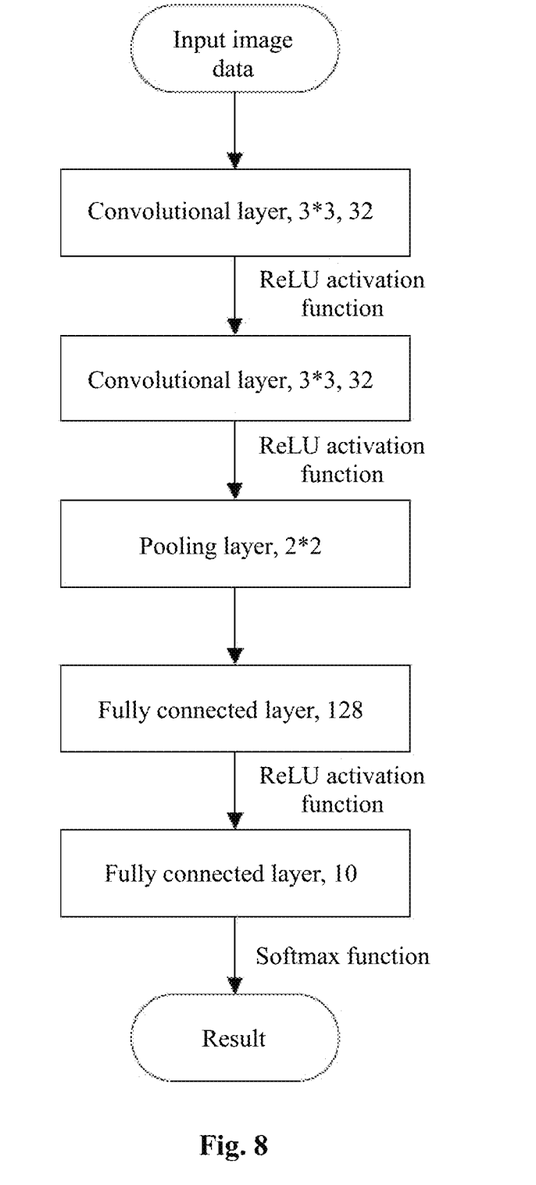
FIG. 8 is a schematic diagram of a convolutional neural network model used in an embodiment of the present invention.

With reference to FIGS. 7 and 8, the image data is decomposed into layers with different pixel sizes in the convolutional neural network (CNN) model, which learns a mapping relationship between input and output from the input image data without human intervention in accurate expression of features. An input layer is an array transformed from pixels of an image. The convolutional neural network model includes multiple convolutional layers, pooling layers, fully connected layers, etc., which can be regarded as neural networks composed of connected neurons. An output layer relates to an identification result. The input layer, a hidden layer composed of three convolutional pooling layers, and a fully connected layer are included. Data entering the input layer is an array transformed from a two-dimensional color map (in RGB color mode), and a size of the data is a result obtained by multiplying a resolution of the image by the number of bytes of an RGB image (for example, width×height×3). Data from the input layer first enters the first convolutional layer. The convolutional layer has its corresponding filter, which is a number matrix. In the convolutional layer, a new matrix, namely, a feature map, is obtained by convolution multiplication of an input matrix and a filter matrix.

At the convolutional layer, a filter size, a stride, and a padding mode are adjusted according to actual application, where a selected filter determines a range of each sampling, the stride determines the number of pixels to be slid in every sampling, and the padding modes include zero padding and discard padding (used for a case that the filter size is inconsistent with an image size). Properties of convolution operation make the feature map retain a relationship between pixels in an original image. The feature map is reduced dimension at the pooling layer, enters the second convolutional layer, and then pooling is performed on the feature map again. In addition to preserving the relationship between image pixels, image data needs to be compressed in three manners: maximum pooling, average pooling, and sum pooling.

At an activation layer, different functions are selected to perform non-linear processing on data, among which a commonly used one is a rectified linear unit (ReLU). The convolutional layer with different filters realizes various operations on the image, such as edge detection, contour detection, blurring, and sharpening.

After multiple convolution and pooling operations, the data is transferred to the fully connected layer. The image data is classified by using an excitation function (for example, a logistic regression function with loss), and a final output result of probability indicates a probability that the input image belongs to a certain category.

During evaluation, it is determined whether a model is overfitted based on differences between accuracy and between loss values of a training sample and a validation sample. If a difference between accuracy values in training and validation stages is large, it means that the model is overfitted. Lower accuracy in the training and validation stages indicates that an image identification effect is not satisfactory. The model uses binary cross entropy as an objective function, to make the model perform update and iteration to minimize a loss value. Therefore, a smaller loss value indicates a better data fitting effect of the trained model. Training and validation results in the present invention are recorded in a background database, and test results are embodied in the following visual analysis diagrams of models.

For example, the MS COCO dataset may be used as a default dataset. The MS COCO data set was released by Microsoft in 2014, containing more than 80,000 training images, which marked 80 common objects in life, such as cat, dog, plane, table, car, etc., and provided about 40,000 test images. The dataset was updated again in 2019, added with 300,000 new images of the existing categories. The dataset provides completely open content, so that the same dataset is used as a benchmark against which algorithmic models proposed by all parties can be compared.

As an implementation, the mobile terminal further includes a character recognition module which is configured to recognize characters in the image and send a recognition result to the assistive smart glasses.

A visually impaired user can get assistance on his/her own by using the character recognition module of the present invention. If he/she needs to recognize characters on a letter or building notice, he/she can hold the object in one hand and take photos using the mobile phone in the other hand, so that the characters can be recognized through a character recognition function. The character recognition module can also convert the recognized characters into audio sound and read to the visually impaired user.

The voluntary worker support function and artificial intelligence character recognition function are complementary. For simple character recognition, a visually impaired user can choose to finish the recognition without the help of a voluntary worker, but for an object with complex faces or when in need of a video of a nearby environment, the user needs to send photos to a voluntary worker or contact a voluntary worker through a video real-time function and get real-time assistance.

Figure 6:
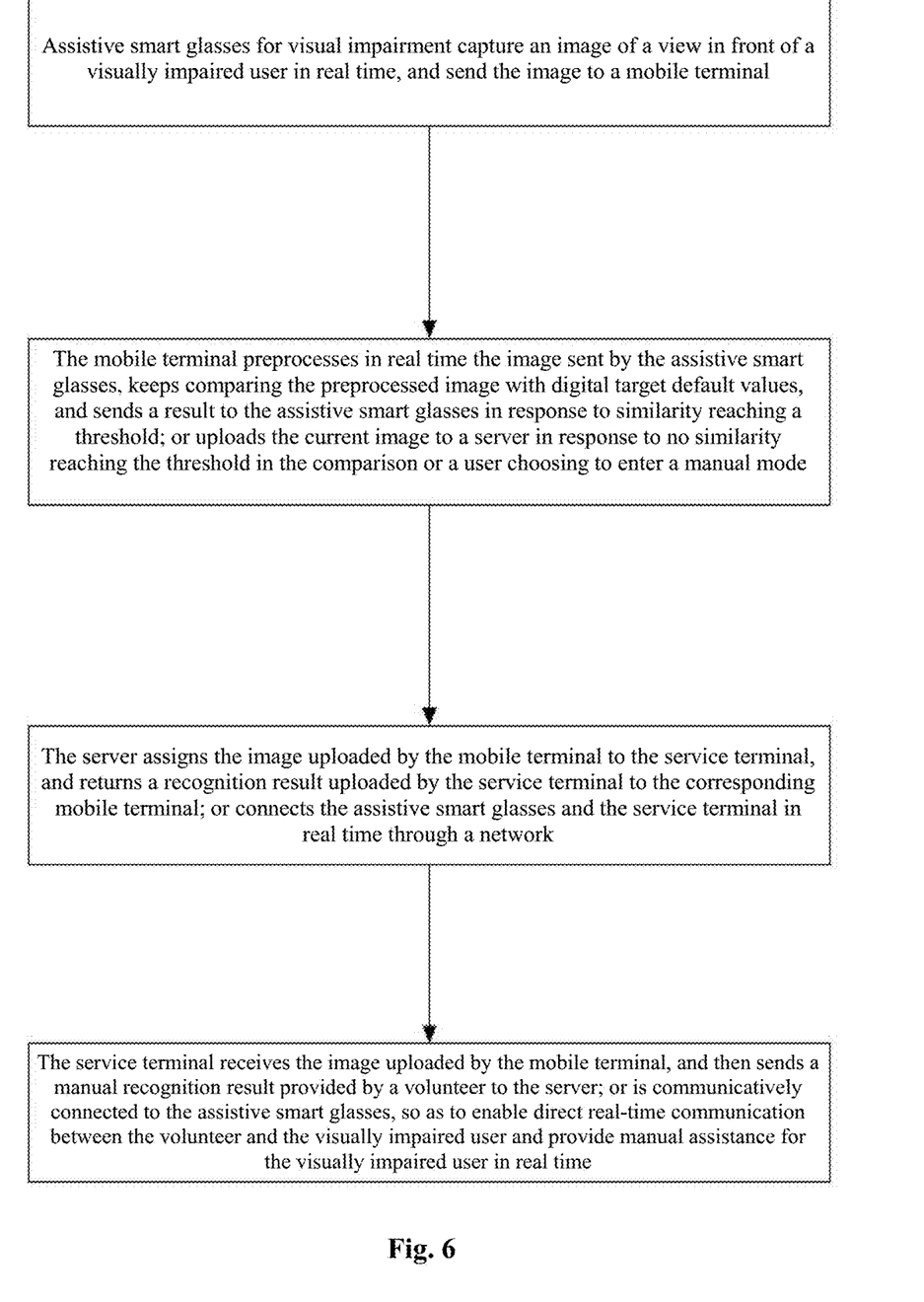
FIG. 6 is a flowchart of a control method of an assistive smart glasses system for visual impairment according to an embodiment of the present invention.

FIG. 6 shows a control method of an assistive smart glasses system for visual impairment according to an embodiment of the present invention, the method including the following steps:

step 1: assistive smart glasses for visual impairment capturing an image of a view in front of a visually impaired user in real time and sending the image to a mobile terminal;

step 2: the mobile terminal preprocessing in real time the image sent by the assistive smart glasses, keeping comparing the preprocessed image with digital target default values, and sending a result to the assistive smart glasses in response to similarity reaching a threshold; or uploading the current image to a server, in response to no similarity reaching the threshold in the comparison or a user choosing to enter a manual mode;

step 3: the server assigning the image uploaded by the mobile terminal to the service terminal, and returning a recognition result uploaded by the service terminal to the corresponding mobile terminal; or connecting the assistive smart glasses and the service terminal in real time through a network; and step 4: the service terminal receiving the image uploaded by the mobile terminal, and then sending a manual recognition result provided by a volunteer to the server; or being communicatively connected to the assistive smart glasses, so as to enable direct real-time communication between the volunteer and the visually impaired user and provide manual assistance for the visually impaired user in real time.

As an implementation, at step 1, the image is preprocessed using a convolutional neural network model to output a result obtained by processing the image data sequentially through a first convolutional layer, a second convolutional layer, a pooling layer, a first fully connected layer, and a second fully connected layer of the convolutional neural network model.

As an implementation, step 1 further includes a character recognition substep: recognizing characters in the image and sending a recognition result to the assistive smart glasses.

The embodiments of the present invention provide the following three assistance methods for a visually impaired user. (1) The mobile terminal automatically recognizes an image of a view in front of the assistive smart glasses, and sends a recognition result to the assistive smart glasses, which outputs the result through audio sound, so that the visually impaired user can understand the image of the view in front of him/her. (2) For complex situations such as a street environment, the visually impaired user can send an image to the server and a volunteer through the assistive smart glasses and the mobile terminal, so that a volunteer who is free at the moment can describe the image to the user. (3) The visually impaired user can also choose to contact a volunteer by video, and a volunteer who is free at the moment can provide visual assistance for the user in their real-time communication. (4) The mobile terminal automatically identifies a character image of a view in front of the assistive smart glasses, and recognizes characters in the image and sends a recognition result to the assistive smart glasses, which outputs the result through audio sound, so that the visually impaired user can understand the text.

The four functions of the present invention are complementary, where the artificial intelligence character recognition is an automatic function without the help of a volunteer, and therefore can be used by the visually impaired users for self-assistance. The functions in which a volunteer describes an image and a volunteer contacts the visually impaired user by video are more suitable for complex situations. The present invention is intended to connect visually impaired people with caring volunteers and make contributions to public welfare. The present invention enables volunteers to direct visually impaired people through audio sound or text, so that the visually impaired people can receive text and image information more conveniently.

Although the embodiments of the present invention have been shown and described, it can be understood by those of ordinary skill in the art that various changes, modifications, substitutions, and variations may be made to these embodiments without departing from the principles and concepts of the present invention, and the scope of the present invention is defined by the appended claims and their equivalents.

The invention claimed is:

1. An assistive smart glasses system for visual impairment, comprising a assistive smart glasses for visual impairment, and further comprising a mobile terminal, a server, and a service terminal, wherein the assistive smart glasses for visual impairment comprises a glasses body, wherein a microprocessor, a bone conduction headphone, a wireless communication module, a CCD optical module, a DSP image processing module, a camera lens, a memory module, a power supply module, a rechargeable battery, and an 110 data port are integrated in the glasses body; the camera lens is disposed at a front end of the glasses body; the CCD optical module converts an optical image captured by the camera lens into high-resolution compression data and sends the high-resolution compression data to the DSP image processing module; the microprocessor is electrically connected to the bone conduction headphone, the wireless communication module, and the DSP image processing module via the I/O data port; the memory module and the power supply module are electrically connected to the microprocessor; and the rechargeable battery is electrically connected to the power supply module;

the assistive smart glasses are configured to be communicatively connected to the mobile terminal through a wireless communication module, capture an image of a view in front of a visually impaired user in real time, send the image to the mobile terminal, and output information returned by the mobile terminal through the bone conduction headphone;

the mobile terminal is configured to preprocess in real time the image sent by the assistive smart glasses, keep comparing the preprocessed image with digital target default values, and send a result to the assistive smart glasses in response to similarity reaching a threshold; or in response to no similarity reaching the threshold in the comparison or a user choosing to enter a manual mode, upload the current image to the server and send information returned by the server to the assistive smart glasses;

the server is configured to assign the image uploaded by the mobile terminal to the service terminal, and return a recognition result uploaded by the service terminal to the corresponding mobile terminal; or connect the assistive smart glasses and the service terminal in real time through a network; and the service terminal is configured to be used by a corresponding volunteer to receive the image uploaded by the mobile terminal via the service terminal and then send a manual recognition result provided by the volunteer to the server; or to be communicatively connected to the assistive smart glasses, so as to enable direct real-time communication between the volunteer and the visually impaired user and provide manual assistance for the visually impaired user in real time.

2. The assistive smart glasses system for visual impairment of claim 1, wherein the mobile terminal preprocesses the image using a convolutional neural network model, and outputs a result obtained by processing the image data sequentially through a first convolutional layer, a second convolutional layer, a pooling layer, a first fully connected layer, and a second fully connected layer of the convolutional neural network model.

3. The assistive smart glasses system for visual impairment of claim 1, wherein the mobile terminal further comprises a character recognition module which is configured to recognize characters in the image and send a recognition result to the assistive smart glasses.

4. A control method of assistive smart glasses system for visual impairment, comprising:
step 1: assistive smart glasses for visual impairment capturing an image of a view in front of a visually impaired user in real time and sending the image to a mobile terminal;
step 2: the mobile terminal preprocessing in real time the image sent by the assistive smart glasses, keeping comparing the preprocessed image with digital target default values, and sending a result to the assistive smart glasses in response to similarity reaching a threshold; or uploading the current image to a server, in response to no similarity reaching the threshold in the comparison or a user choosing to enter a manual mode;
step 3: the server assigning the image uploaded by the mobile terminal to the service terminal, and returning a recognition result uploaded by the service terminal to the corresponding mobile terminal; or connecting the assistive smart glasses and the service terminal in real time through a network; and
step 4: the service terminal receiving the image uploaded by the mobile terminal, and then sending a manual recognition result provided by a volunteer to the server; or being communicatively connected to the assistive smart glasses, so as to enable direct real-time communication between the volunteer and the visually impaired user and provide manual assistance for the visually impaired user in real time.

5. The control method of assistive smart glasses system for visual impairment of claim 4, wherein at step 1, the image is preprocessed using a convolutional neural network model to output a result obtained by processing the image data sequentially through a first convolutional layer, a second convolutional layer, a pooling layer, a first fully connected layer, and a second fully connected layer of the convolutional neural network model.

6. The control method of assistive smart glasses system for visual impairment of claim 4, wherein step 1 further comprises a character recognition substep: recognizing characters in the image and sending a recognition result to the assistive smart glasses.

* * * * *